Patented June 21, 1927.

1,633,466

UNITED STATES PATENT OFFICE.

WALTHER TRAXL, OF VIENNA, AUSTRIA.

PROCESS OF PREPARING STABLE COLLOIDAL SOLUTIONS OF SILVER.

No Drawing. Application filed March 6, 1924, Serial No. 697,415, and in Germany March 13, 1923.

The silver-oil preparations hitherto known and used for therapeutic objects are aqueous solutions of colloidal silver in fatty emulsions. For instance unguentum credei and collol according to Dr. Pleschner.

I have found by observation that emulsions of an aqueous solution of collargol (e. g. a colloidal silver which is soluble in water) in oil produce better remedial results in certain cases, for instance when treating cystitis, than the aqueous collargol-solution alone, and I have made efforts to colloidally dissolve metallic silver in oil. The present invention has for its object the production of a durable colloidal silver-oil solution which can be employed for therapeutic objects and does not contain any water, the colloidal silver being contained and directly dissolved in the fatty substance and being free of any disturbing impurities.

However it is not possible to obtain in accordance with the directions given by Bredig (Zsigmondy, Kolloidchemie III$^{rd}$ edition, page 181) a colloidal silver-solution in oil by dispersion in an electrical manner, and further it has not been possible to produce this colloidal solution by an electrical dispersion in accordance with the process stated by Burton (Abegg, Handbuch der anorganischen Chemie, report about colloidal silver) by supplying ions of hydrogen to the oil by means of adding oleic acid or palmitic acid. By filtering through ordinary filterpaper, the suspensions of silver thus obtained could be separated into their constituents, silver and oil.

Another possible way to obtain the desired result was the reduction of compounds of silver which are soluble in oil or finely divided in the same.

For instance the experiment has been made to obtain such colloidal solutions of silver in oil by reduction of silver oleate in oil. Other experiments with the same object were made by heating up to about 120 degrees centigrade a silverhydroxid-silveroxid mixture finely distributed in oil, in order to produce a combination between the oil and silver, in this sense, that a fatty acid salt of silver would be produced by the saponification of the oil with silverhydroxid. The molecular solutions of compounds of silver in oil thus obtained were reduced by hydrogen.

However these and similar experiments were not always successful and there sometimes resulted a jelly-like oleate of silver with a great deal of colloidal silver, which separated from the oil-solution, and there sometimes resulted colloidal silver-solutions which only sometimes were durable, but which in most cases deposited silver or silver soaps after a few days.

So the known processes carried out in accordance with the known state of art did not yield satisfactory results.

Now I have found that durable colloidal silver-solutions in oil, fat or the fatty acids can be produced from said silver compounds, by supplying to the heated solvent, about between 200 and 300 degrees centigrade, a compound of silver which may be soluble in the oil or not, as desired. However as the use of compounds, such as nitrate of silver, sulphate of silver and so forth as primary materials had to be avoided because the impurities separated during the reduction would have to be removed subsequently by a very troublesome operation, I have decided to take advantage of the fact, that the silverhydroxid and some other combinations of silver are so strongly basic, that they can saponify even neutral fats.

The above stated temperature of 200 to 300 degrees centigrade is quite enough to cause some decomposition of the silver compounds probably assisted by the reducing action of the oil, so that reduction of a small amount of the silver compounds to metalic silver will take place. At this temperature apparently the necessary protective colloids are formed in an amount just sufficient to maintain the metallic silver in solution. The exact nature of the protective colloids is quite immaterial for the present process, but apparently they may be silver salts of fatty acids or products of oxidation of the oil.

Solutions of mixtures of silveroxid-silverhydroxide in oil, produced according to this process could be reduced still further without separating, by adding reducing agents thereto or by introducing hydrogen thereinto, and they also retain their stability, so that by this modification of the process, higher concentrations, and at the same stability, can be obtained.

However the amount of colloidal silver so produced is not usually sufficient for practical use. I therefore increase said amount by causing a reduction with very small quantities of an organic oil-soluble reducing agent (for instance hydroquinone), during the saponification, after which owing to the catalytic action of the silver particles produced the subsequently introduced hydrogen will act in a better manner, whereby higher concentrations of silver are obtainable than without this means.

The concentration of the solutions thus produced is limited in that solutions of fatty acid salts of silver in oils or fats form a jelly at a relatively low concentration of silver and at relatively high temperatures, the said jelly not permitting the solution of any further silver. Therefore it is of advantage to treat several times and in like manner the solutions produced according to the above principles, as there the combination of the silver hydroxide disturbing the chemical equilibrium is reduced to silver and fatty acid and does not any more form jelly and thus permits a further saponification and reduction of the silver even if several times repeated, whereby an important increase in the percentage of silver may be produced.

All the modifications of the process above referred to may be applied to fats and fatty acids of all kinds without any difficulty.

Similar to the described mixture of silveroxide-silverhydroxide act also silver-carbonate and other silver-salts which yield soap with fats, (hereinafter included in the expression "highly basic silver compounds").

However when using in the above process hydroxide of nickel instead of the combination of silver, if the resulting reaction differs in that a colloidal solution of nickel in oil is not formed, but a separation of a jelly which seems to contain a soap of nickel and colloidal nickel is obtained. Therefore also according to the German Patent No. 292,649 oxide of nickel is employed in order to produce a colloidal nickel-catalyzer in oil, which is designated by NiO in this patent.

I have found that the colloidal silver-solutions in oils, fats or fatty acids produced according to the present invention may be employed without difficulty for the dissolution of mercury.

This colloidal silver-solution possesses the ability to dissolve metallic mercury as well as also oxide of mercury and other mercury compounds, when shaken for some time with the said substances and particularly when heated, so that besides the colloidal silver also colloidal mercury can be obtained in the state of solution.

The solutions thus produced may be employed for remedial purposes and they are in a liquid state of great fluidity if they are produced in oils.

These facts clearly differentiate the present invention from the known processes by which colloidal metallic salt solutions (nickel and mercury) in oil are obtained.

Example 1.

100 grammes oil or fat are heated to 200 degrees centigrade, then 2 grammes of a mixture of silveroxide-silverhydroxide (as it is obtained by the precipitation of a silver-salt solution with a solution of caustic soda) are introduced by stirring and while increasing the temperature up to 300 degrees. Heat is applied for some further time and the solution is filtered. Hydrogen is introduced into the hot filtrate until a maximum of the black colour is attained, which is recognizable by the constancy of the colorimetrical effect.

Example 2.

The same as example 1, but before the introduction of the silver-compound 0.2 grammes of hydroquinon are mixed with the 100 grammes of oil or fat.

Example 3.

The solutions produced according to example 2 serve instead of the oils and fats as primary material for a new operation which may be repeated several times according to the above examples until the desired concentration of silver is attained.

Example 4.

100 grammes fatty acid are used instead of the oil in examples 1, 2 or 3.

Example 5.

100 grammes of the colloidal silver-solution produced according to examples 1, 2 or 3 in olive-oil and containing 1,5 per thousand of silver are heated with a few drops of mercury in a metallic state for ½ hour, the mercury not used up is separated from the solution and a solution results, which compared with the primary product has considerably increased in colour-intensity and which besides 1,5 per thousand of silver contains colloidally dissolved 2,0 per thousand of mercury.

Example 6.

100 grammes of the colloidal silver-solution produced according to examples 1, 2 or 3 in lard and containing 4 per thousand of silver are mixed in a hot state with one gramme of mercury-oxide and are boiled for ½ hour and filtered. The percentage of mercury amounts to 2,5 per thousand.

The term "oil" as used in the appended claims is intended to embrace normally solid and normally liquid oils (fats and oils).

I claim:—

1. A process of preparing stable colloidal solutions of silver in an oil, by introducing silver compounds capable of forming soaps with fatty substances into the said oil at a temperature between 200 and 300 degrees centigrade, filtering the obtained solution and enriching it with colloidal silver by treating the said solution with a reducing agent, and repeating the addition of silver compounds and the reducing operation, several times.

2. A process of preparing stable colloidal solutions of silver in an oil by an oil-soluble reducing agent into the oil and thereafter introducing silver compounds capable of forming soaps with fatty substances in a fat at a temperature between 200 and 300 degrees centigrade, filtering the obtained solution and enriching it with colloidal silver by treating the said solution with a reducing agent, repeating the addition of silver compounds and the reducing step, until a sufficient content of colloidal silver is present in the product.

3. A process of preparing stable colloidal solutions of silver in acids of fatty substances by introducing silver compounds capable of forming soaps with fatty substances into the acids of fatty substances, at a temperature between 200 and 300 degrees centigrade, filtering the obtained solution and enriching it with colloidal silver by treating the said solution with hydrogen and repeating the addition of such silver compounds and hydrogen treatment.

4. A process of preparing stable colloidal solutions of silver in an oil by first introducing into the oil a reducing agent soluble in oil, then adding silver compounds capable of forming soaps with fatty substances at a temperature between 200 and 300 degrees centigrade, filtering the obtained solution and enriching it with colloidal silver by treating the said solution with a reducing agent.

5. A process of preparing stable colloidal solutions of silver in a fat by first introducing into the fat a reducing agent soluble in the said fat, then adding silver compounds capable of forming soaps with fatty substances at a temperature between 200 and 300 degrees centigrade, filtering the obtained solution and enriching it with colloidal silver by treating the said solution with a reducing agent.

6. A process of preparing stable colloidal solutions of silver in fatty acids by first introducing into the said acids a reducing agent soluble in the said acids, then adding silver compounds capable of forming soaps with fatty substances at a temperature between 200 and 300 degrees centigrade, filtering the obtained solution and enriching it with colloidal silver by treating the said solution with a reducing agent.

7. A process of preparing stable colloidal solutions of silver in an oil by introducing silver compounds capable of forming soaps with fatty substances into the said oil at a temperature beween 200 and 300 degrees centigrade, filtering the obtained solution and enriching it with colloidal silver by treating the said solution with a reducing agent, adding mercury to the resulting liquid, heating the whole and finally separating the liquid from the excess of mercury.

8. A process of preparing stable colloidal solution of silver in oil by introducing silver compounds capable of forming soaps with fatty substances in the said oil at a temperature between 200 and 300 degrees centigrade, filtering the obtained solution and enriching it with colloidal silver by treating the said solution with a reducing agent, adding to the resulting liquid a compound of mercury, heating the whole and finally separating the liquid from the excess of the mercury compound.

9. A process of preparing stable colloidal solutions of silver in a fat by introducing silver compounds capable of forming soaps with fatty substances in the said fat at a temperature between 200 and 300 degrees centigrade, filtering the obtained solution and enriching it with colloidal silver by treating the said solution with a reducing agent, adding mercury to the resulting product, heating the whole and finally separating the liquid from the excess of mercury.

10. A process of preparing stable colloidal solutions of silver in a fat by introducing silver compounds capable of forming soaps with fatty substances into the said fat at a temperature between 200 and 300 degrees centigrade, filtering the obtained solution and enriching it with colloidal silver by treating the said solution with a reducing agent, adding to the resulting liquid a compound of mercury, and finally separating the liquid from the excess of the mercury compound.

11. A process of preparing stable colloidal solutions of silver in acids of fatty substances by introducing silver compounds capable of forming soaps with fatty substances into the said acids at a temperature between 200 and 300 degrees centigrade, filtering the obtained solution and enriching it with colloidal silver by treating the said solution with a reducing agent, adding mercury to the resulting product, heating the whole and finally separating the liquid from the excess of mercury.

12. A process of preparing stable colloidal solutions of silver in acids of fatty substances by introducing silver compounds capable of forming soaps with fatty substances into the said acids at a temperature between 200 and 300 degrees centigrade, filtering the obtained solution and enriching it with colloidal silver by treating the said solution with a reducing agent, adding to the resulting liquid a compound of mercury and finally separating the liquid from the excess of mercury.

13. A process of preparing stable colloidal solutions of silver in fatty substances by first introducing into the fatty substance a reducing agent soluble in the said fatty substance, adding silver compounds capable of forming soaps with fatty substances at a temperature between 200 and 300 degress centigrade, filtering the obtained solution and enriching it with colloidal silver by treating the said solution with a reducing agent, and further adding mercury to the resulting product.

14. A process of preparing stable colloidal solutions of silver in fatty substances by first introducing into the fatty substances a reducing agent soluble in the said fatty substance, adding silver compounds capable of forming soaps with fatty substances at a temperature between 200 and 300 degrees centigrade, filtering the obtained solution and enriching it with colloidal silver by treating the said solution with a reducing agent, and further adding to the resulting liquid a compound of mercury.

15. A preparation consisting of a fatty substance in which amalgam of silver and mercury is dissolved in a colloidal manner.

16. A process of preparing stable colloidal silver solutions in oil which comprises adding to the hot oily material a silver compound which is capable of reacting upon fatty acids to form a soap, filtering and treating with a reducing agent to increase the content of colloidal silver and repeating the addition of such silver compounds and the reducing operation, several times.

17. A process of preparing stable colloidal silver solutions in oil which comprises dissolving a reducing agent in an oily material, then adding to the hot oily material a silver compound which is capable of reacting upon fatty acids to form a soap, filtering and treating with a reducing agent to increase the content of colloidal silver.

In testimony whereof I affix my signature.

WALTHER TRAXL.